United States Patent
Muggeo et al.

(10) Patent No.: US 8,875,819 B2
(45) Date of Patent: Nov. 4, 2014

(54) HYBRID DRIVE SYSTEM FOR HYBRID ELECTRIC VEHICLES

(75) Inventors: Filippo Muggeo, Endwell, NY (US); Derek Matthews, Vestal, NY (US)

(73) Assignee: BAE Systems Controls Inc., Johnson City, NY (US)

(*) Notice: Subject to any disclaimer, the term of this patent is extended or adjusted under 35 U.S.C. 154(b) by 600 days.

(21) Appl. No.: 12/714,809

(22) Filed: Mar. 1, 2010

(65) Prior Publication Data
US 2011/0209933 A1    Sep. 1, 2011

(51) Int. Cl.
| | |
|---|---|
| B60K 6/48 | (2007.10) |
| B60W 10/08 | (2006.01) |
| B60W 30/18 | (2012.01) |
| B60W 10/02 | (2006.01) |
| B60K 6/52 | (2007.10) |
| B60K 17/36 | (2006.01) |
| B60W 20/00 | (2006.01) |

(52) U.S. Cl.
CPC ........... *B60K 6/48* (2013.01); *B60Y 2200/1422* (2013.01); *Y02T 10/6265* (2013.01); *B60W 10/08* (2013.01); *Y02T 10/6221* (2013.01); *B60W 30/18127* (2013.01); *B60W 10/02* (2013.01); *B60K 17/36* (2013.01); *B60W 20/00* (2013.01); *B60K 6/52* (2013.01)
USPC ...................................... 180/65.25; 180/65.31

(58) Field of Classification Search
USPC ......... 180/15, 16, 65.22, 65.25, 65.26, 65.31; 477/2, 5, 6, 3
See application file for complete search history.

(56) References Cited

U.S. PATENT DOCUMENTS

| | | | |
|---|---|---|---|
| 4,862,987 A | 9/1989 | Legueu | |
| 5,147,003 A * | 9/1992 | De Monclin | 180/14.2 |
| 6,127,813 A | 10/2000 | Tamagawa | |
| 6,387,007 B1 | 5/2002 | Fini, Jr. | |
| 6,435,296 B1 * | 8/2002 | Arai | 180/243 |
| 6,719,379 B2 | 4/2004 | Crombrez | |
| 6,857,985 B2 | 2/2005 | Williams | |
| 6,888,273 B2 | 5/2005 | Hughes et al. | |
| 7,099,756 B2 | 8/2006 | Sato | |
| 7,147,070 B2 * | 12/2006 | Leclerc | 180/14.2 |

(Continued)

FOREIGN PATENT DOCUMENTS

| | | |
|---|---|---|
| FR | 2 799 697 A1 | 4/2001 |
| JP | 2005-233272 A | 9/2005 |
| WO | WO 2009/108089 A1 | 9/2009 |

OTHER PUBLICATIONS

Chujyou, Satoru et al., "e-4 WD system", VT-02-26, Nissan Motor Co., LTD (Dec. 6, 2002), pp. 1-6, with English Abstract.

(Continued)

*Primary Examiner* — John Walters
(74) *Attorney, Agent, or Firm* — Scully, Scott, Murphy & Presser, P.C.

(57) ABSTRACT

A hybrid electric drive system is provided for driving a medium or heavy duty vehicle. The drive system includes an internal combustion engine configured as the primary source of motive power. The engine is coupled to a front-most axle and a first drive shaft in mechanical communication with a middle drive axle. The drive system also includes an electric motor and a clutch assembly; and a second driveshaft in mechanical communication with the electric motor and a rear-most drive axle. When the electric motor is not in active operation, the clutch assembly disengages the electric motor from the rear-most drive axle.

18 Claims, 1 Drawing Sheet

(56) References Cited

U.S. PATENT DOCUMENTS

| | | | |
|---|---|---|---|
| 7,195,087 | B2 | 3/2007 | Hatsuda et al. |
| 7,296,644 | B2 * | 11/2007 | Teraoka .................... 180/65.25 |
| 7,520,354 | B2 * | 4/2009 | Morrow et al. ............ 180/65.31 |
| 7,572,201 | B2 | 8/2009 | Supina et al. |
| 2002/0058564 | A1 * | 5/2002 | Yamamoto et al. ................ 477/3 |
| 2005/0109549 | A1 | 5/2005 | Morrow |
| 2007/0158119 | A1 * | 7/2007 | Pascoe ......................... 180/65.2 |
| 2007/0210743 | A1 | 9/2007 | Tabei et al. |
| 2009/0093336 | A1 | 4/2009 | Soliman et al. |
| 2009/0143188 | A1 | 6/2009 | Soliman et al. |
| 2009/0166106 | A1 | 7/2009 | Batdorf |
| 2009/0321153 | A1 | 12/2009 | Boeckenhoff et al. |

OTHER PUBLICATIONS

Kalberlah, A., "Electric Hybrid Drive Systems for Passenger Cars and Taxis", SAE Technical Paper Series 910247, International Congress and Exposition, Detroit, Michigan, Feb. 25-Mar. 1, 1991, pp. 69-78.

International Search Report and Written Opinion dated Nov. 18, 2011 from related International application No. PCT/US2011/025692.

International Search Report and Written Opinion dated Sep. 4, 2012 from related International application No. PCT/US2011/025692.

Extended Supplementary European Search Report dated Nov. 19, 2013 from related European Application No. 11 75 1071.9.

* cited by examiner

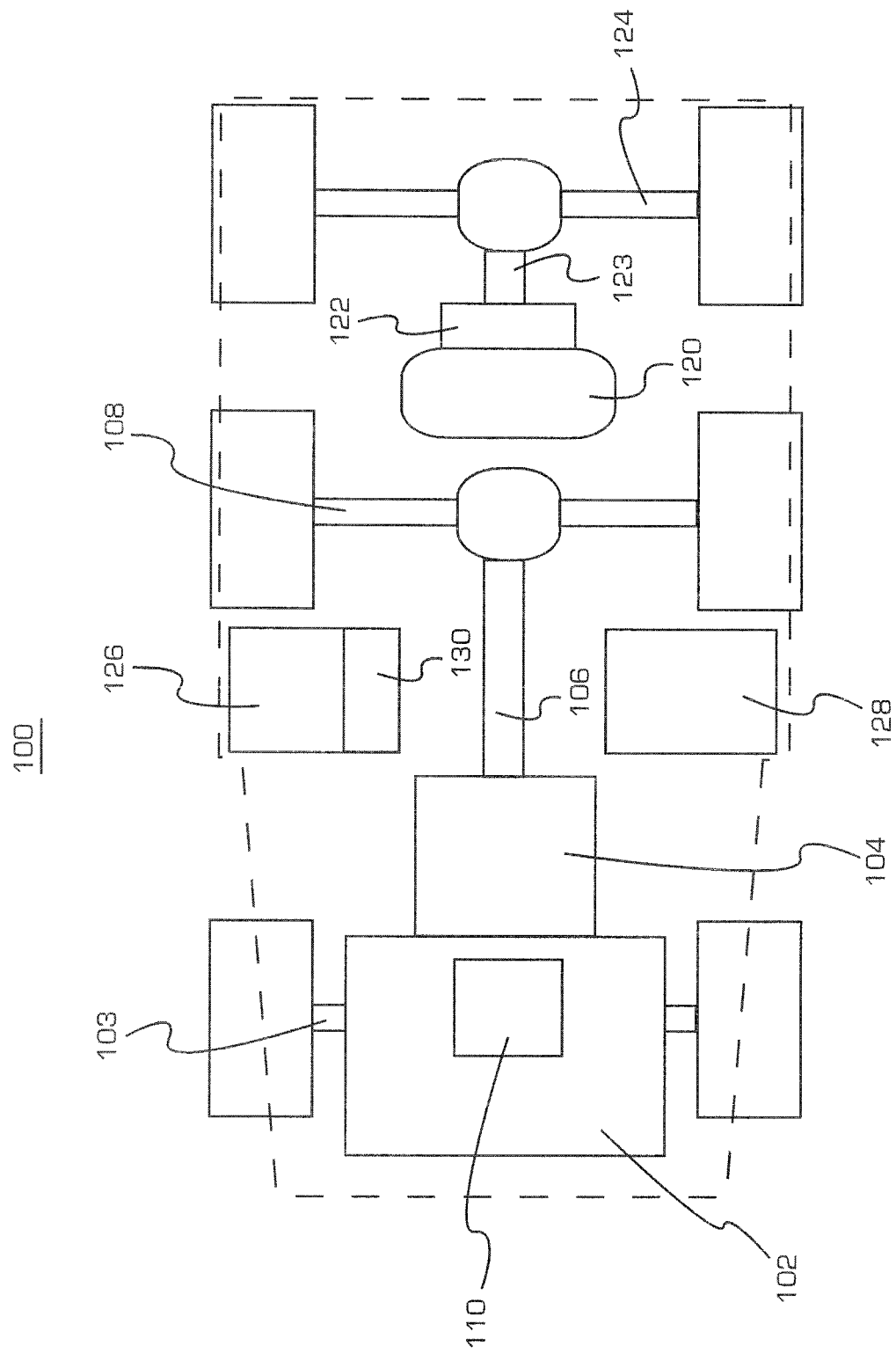

HYBRID DRIVE SYSTEM FOR HYBRID ELECTRIC VEHICLES

I. FIELD OF THE INVENTION

This invention relates to hybrid electric vehicles. More specifically, the invention relates to drive trains for hybrid electric vehicles.

I. BACKGROUND OF THE INVENTION

Hybrid electric vehicles have grown in popularity in response to global climate change worries and the rising cost of petroleum-based fuels. Passenger vehicles have been the major focus of the shift to hybrid vehicles. Many automobile makers have multiple hybrid model lines, ranging from compact to luxury automobiles and even sport utility vehicles (SUVs). Even hybrid commuter buses and taxis are now available.

II. SUMMARY OF THE INVENTION

An embodiment of the present invention provides a system, for driving a vehicle, capable of recovering energy through dynamic braking, and eliminating parasitic losses from the motor. The drive system has a primary drive sub-system; and a supplemental drive sub-system electrically and mechanically isolated from the primary drive sub-system.

The primary drive sub-system includes: a front-most drive axle located at a forward position of the vehicle; a middle drive axle positioned at a distance behind the front-most drive axle; an internal combustion engine dimensioned for providing the primary source of motive power, the internal combustion engine having an internal coupling to the front-most drive axle; and a first drive shaft in mechanical communication with the internal combustion engine and the middle drive axle.

The supplemental drive sub-system includes: an electric motor dimensioned for providing supplemental motive power; an energy storage unit for storing electric energy supplied to the electric motor; a clutch assembly for selectively engaging and disengaging the electric motor; a rear-most drive axle positioned at a distance behind the middle drive axle; and a second driveshaft in mechanical communication between the clutch assembly and the rear-most drive axle.

Additionally, an embodiment of the present invention includes an internal combustion engine; a first drive shaft in mechanical communication with the engine and a middle drive axle; an electric motor including a clutch assembly; a second driveshaft in mechanical communication with the electric motor and a rear-most drive axle, the rear-most drive axle and the middle drive axle being mechanically isolated from one another.

Further, an embodiment of the present invention is hybrid-electric vehicle having a vehicle body, with a plurality of drive axles; an internal combustion engine; a first drive shaft in mechanical communication with the engine and a middle drive axle of the plurality of drive axles; an electric motor including a clutch assembly; a second driveshaft in mechanical communication with the electric motor and a rear-most drive axle of the plurality of drive axles, the rear-most drive axle and the middle drive axle being mechanically isolated from one another; and a drive controller for controlling operation of the clutch assembly.

III. BRIEF DESCRIPTION OF THE DRAWINGS

These and other features, aspects, and advantages of the present invention will become better understood with regard to the following description, appended claims, and accompanying drawings wherein:

FIG. 1 illustrates a block representation of a hybrid vehicle configured with an embodiment of the present invention.

IV. DETAILED DESCRIPTION OF INVENTION

In accordance with the present invention, a medium or heavy duty hybrid electric vehicle 100 is shown in FIG. 1. The hybrid electric vehicle 100 includes an internal combustion engine 102. The internal combustion engine 102 is of a conventional type that uses gasoline, diesel, bio-diesel, compressed natural gas (CNG), or other conventional fuel for initiating and sustaining combustion in one or more combustion chambers. As the workings of the internal combustion engine 102 are well known in the art, the present disclosure will forego providing a detailed description of the operation of the internal combustion engine 102 herein for brevity.

The engine 102 is mechanically coupled to a transmission assembly 104 and drive shaft 106. The transmission 104 provides driver-controlled or vehicle computer-controlled gear ratio selection from among a plurality of gear ratios depending on velocity, torque and acceleration requirements. In turn, the drive shaft is mechanically coupled to a middle drive axle 108.

In the embodiment shown in FIG. 1, the drive axle 108 is the center axle of a three axle arrangement. However, the present invention is not limited to three axle vehicles alone, but rather may be equally applied to vehicles with more than three axles as well. Thus, in the arrangement shown in FIG. 1, motive energy generated by the engine 102 is directed, through the transmission assembly 104 and drive shaft 106, to the middle drive axle 108. The engine 102, in a three axle vehicle, can be configured to drive the front-most axle 103 by way of internal gearsets, as well as the middle drive axle 108.

The engine 102 in the present invention is configured to provide the bulk of the driving energy used by the vehicle 100. Specifically, the engine 102, in combination with the transmission assembly 104, is configured to provide enough power to efficiently operate the vehicle at a constant cruising velocity of, for example, between 50 and 80 miles per hour. The engine 102 may be equipped with a turbo assembly 110 in order to provide additional acceleration power without requiring a larger displacement engine and subsequent reduction in cruising efficiency. Alternatively, the engine 102 may employ variable displacement technologies to control the number of combustion chambers utilized under a given driving condition to optimize fuel usage.

In addition to the conventional internal combustion engine 102 drive system described above, the vehicle 100 includes a second drive system utilizing an electric motor 120, and clutch assembly 122 mechanically coupled to a rear-most drive axle 124, by way of a second drive shaft 123. In an embodiment of the present invention, the clutch assembly 122 is a dry clutch housed with the electric motor 120 as a single integrated unit. Alternatively, the clutch assembly 122 may be housed separately from the electric motor 120. Also, the clutch assembly of the present invention is not limited to only a dry clutch; other clutch designs may be used as appropriate.

As shown in FIG. 1, the electric motor 120 is positioned forward of the rear-most drive axle 124. However, in alternative embodiments, the electric motor 120 may be placed behind or above the rear-most drive axle 124.

The electric motor 120 receives electrical energy from energy storage unit 126, such as Lithium-Ion batteries, hydrogen fuel cells, or other energy storage technologies capable of providing the necessary electrical power to the electric motor 120. Collectively, these various energy storage technologies are referred herein generically as batteries. A motor controller 128 is provided as well, to control the operation of the electric motor 120, as described below.

The energy storage unit 126 is configured to provide a high voltage output adequate to drive the electric motor 120. The high voltage output from the battery can be in the hundreds of volts, for example 325 Volts DC. Therefore, a DC-to-DC converter 130 may be provided in electrical communication between the high voltage batteries and vehicle accessories for stepping down the high voltage output of the batteries to more appropriate voltages used by the accessories, such as 12 or 24 Volts DC. The use of a DC-to-DC converter 130 allows the energy storage unit 126 to provide low voltage power to the low voltage batteries/conventional batteries, and provide power to accessories comprising a hotel load when the engine is not operating.

In the arrangement described above and shown in FIG. 1, the engine 102 provides the primary motive energy for the vehicle 100. The electric motor 120 provides supplemental motive power, which allows the engine 102 to have a smaller displacement than would otherwise be required to drive the vehicle. As long as the electric motor 120 is supplied with adequate electric energy form the energy storage unit 126, the electric motor 120 supplements the engine power output by separately driving the rear-most drive axle 124. The clutch assembly 122 mechanically engages the electric motor 120 to the rear-most drive axle 124 when the supplemental motive power is desired.

When not actively powering the rear-most drive axle 124, the motor controller 128 controls the clutch assembly 122 to disengage, thus mechanically isolating, the electric motor 120 from the rear-most drive axle 124. By isolating the electric motor 120 from the rear-most drive axle 124, parasitic power loss due to the electric motor 120 acting as a load is eliminated. Consequently, the drive system disclosed herein is capable of visualizing greater fuel efficiency than conventional drive systems.

Additionally, during periods of deceleration, either by friction braking or dynamic braking (i.e., engine braking), the motor controller 128 controls the clutch assembly 122 to engage the electric motor 120 with the rear-most drive axle 124. In the braking situation, this configuration allows the electric motor to operate as an electric generator in order to recoup braking energy for recharging the energy storage unit 126. Moreover, the energy storage unit 126 can be charged via a plug-in connection to an electrical power grid.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A hybrid drive system for a vehicle, the hybrid drive system comprising:
   a primary drive sub-system having:
      a front-most drive axle located at a forward position of the vehicle,
      a middle drive axle positioned at a distance behind the front-most drive axle,
      an internal combustion engine dimensioned for providing the primary source of motive power, the internal combustion engine having an internal coupling to the front-most drive axle, and
      a first drive shaft in mechanical communication with the internal combustion engine and the middle drive axle;
   a supplemental drive sub-system electrically and mechanically isolated from the primary drive sub-system, the supplemental drive sub-system having:
      an electric motor dimensioned for providing supplemental motive power,
      an energy storage unit for storing electric energy supplied to the electric motor,
      a clutch assembly for selectively engaging and disengaging the electric motor,
      a rear-most drive axle positioned at a distance behind the middle drive axle, and
      a second driveshaft in mechanical communication between the clutch assembly and the rear-most drive axle; and
   a drive controller for controlling the electric motor and the clutch assembly, the drive controller controlling engagement of the clutch assembly only:
      when supplemental motive power is demanded to supplement primary motive power generated by the internal combustion engine to transfer power from the electric motor to the rear-most drive axle, and
      when the vehicle is decelerating to transfer motive power from the rear-most drive axle to the electric motor to recharge the energy storage unit, and
   the drive controller is configured to control disengagement of the clutch assembly at other times including when the primary drive sub-system satisfies a demanded motive power during cruising or acceleration of the vehicle in order to isolate the electric motor from the rear-most drive axle.

2. The hybrid drive system as in claim 1, wherein the electric motor is positioned forward of the rear-most drive axle.

3. The hybrid drive system as in claim 1, wherein the energy storage unit receives charging energy from the electric motor operating as an electric generator during periods of recuperative braking.

4. The hybrid drive system as in claim 1, wherein the drive controller controls engagement of the clutch assembly during vehicle braking for generating recuperative energy by the electric motor operating as a generator.

5. The hybrid drive system as in claim 1, wherein the electric motor and the clutch assembly are integrated.

6. A hybrid drive system for a vehicle having a front drive axle, a middle drive axle and a rear drive axle, the hybrid drive system comprising:
   an internal combustion engine;
   a first drive shaft in mechanical communication with the engine and the middle drive axle;
   an electric motor including a clutch assembly;
   a second driveshaft in mechanical communication with the electric motor and the rear drive axle, the rear drive axle and the middle drive axle being mechanically isolated from one another;
   an energy storage unit for storing and providing energizing power to the electric motor, the energy storage unit being in electrical communication with the electric motor; and
   a drive controller for controlling the electric motor and the clutch assembly, the drive controller controlling engagement of the clutch assembly only:

when supplemental motive power is demanded to supplement primary motive power generated by the internal combustion engine to transfer power from the electric motor to the rear drive axle, and when the vehicle is decelerating to transfer motive power from the rear drive axle to the electric motor to recharge the energy storage unit, and the drive controller is configured to control disengagement of the clutch assembly at other times including when the internal combustion engine satisfies a demanded motive power during cruising or acceleration of the vehicle in order to isolate the electric motor from the rear drive axle.

7. The hybrid drive system as in claim 6, wherein the electric motor is disposed between the rear drive axle and the middle drive axle.

8. The hybrid drive system as in claim 6, wherein the drive controller controls engagement of the clutch assembly during vehicle braking for generating recuperative energy by the electric motor operating as a generator.

9. The hybrid drive system as in claim 6, wherein the electric motor and the clutch assembly are integrated.

10. The hybrid drive system as in claim 6, wherein the engine is coupled to the front drive axle.

11. A hybrid-electric vehicle, comprising:
 a vehicle body, having a plurality of drive axles;
 an internal combustion engine;
 a first drive shaft in mechanical communication with the engine and a middle drive axle of the plurality of drive axles;
 an electric motor including a clutch assembly;
 a second driveshaft in mechanical communication with the electric motor and a rear-most drive axle of the plurality of drive axles, the rear-most drive axle and the middle drive axle being mechanically isolated from one another; and
 a drive controller for controlling operation of the clutch assembly, the drive controller controlling engagement of the clutch assembly only:
  when supplemental motive power is demanded to supplement primary motive power generated by the internal combustion engine to transfer power from the electric motor to the rear-most drive axle, and
  when the vehicle is decelerating to transfer motive power from the rear-most drive axle to the electric motor to recharge an energy storage unit, and
 the drive controller is configured to control disengagement of the clutch assembly assembly at other times including when the internal combustion engine satisfies a demanded motive power during cruising or acceleration of the vehicle in order to isolate the electric motor from the rear-most drive axle.

12. The hybrid-electric vehicle as in claim 11, wherein the energy storage unit for storing and providing energizing power to the electric motor, the energy storage unit being in electrical communication with the electric motor.

13. The hybrid-electric vehicle as in claim 11, wherein the electric motor is disposed between the rear-most drive axle and the middle drive axle.

14. The hybrid-electric vehicle as in claim 11, wherein the drive controller controls the electric motor.

15. The hybrid-electric vehicle as in claim 14, wherein the drive controller controls engagement of the clutch assembly during vehicle braking for generating recuperative energy by the electric motor operating as a generator.

16. The hybrid-electric vehicle as in claim 14, wherein the drive controller controls disengagement of the clutch assembly to decouple the electric motor from the rear-most drive axle when recuperative energy is not desired.

17. The hybrid-electric vehicle as in claim 11, wherein the electric motor and the clutch assembly are integrated.

18. The hybrid-electric vehicle as in claim 11, wherein the engine is coupled to a front-most axle.

* * * * *